US009219692B2

(12) United States Patent
Kannan et al.

(10) Patent No.: US 9,219,692 B2
(45) Date of Patent: Dec. 22, 2015

(54) REDUCING LATENCIES THROUGH PACKET AGGREGATION (71) Applicant: International Business Machines Corporation, Armonk, NY (US)

(72) Inventors: Kalapriya Kannan, New Delhi (IN); Anuradha Bhamidipaty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 13/869,536

(22) Filed: Apr. 24, 2013

(65) Prior Publication Data
US 2014/0321276 A1 Oct. 30, 2014

(51) Int. Cl.
*H04L 12/801* (2013.01)

(52) U.S. Cl.
CPC ..................... *H04L 47/18* (2013.01)

(58) Field of Classification Search
CPC ....................................................... H04L 47/18
See application file for complete search history.

(56) References Cited

U.S. PATENT DOCUMENTS

| 6,882,642 | B1 | 4/2005 | Kelriwal et al. |
| 7,230,947 | B1 | 6/2007 | Huber et al. |
| 2003/0037042 | A1* | 2/2003 | Kametani .................. 707/3 |
| 2006/0182119 | A1* | 8/2006 | Li et al. .................. 370/395.52 |
| 2007/0201440 | A1* | 8/2007 | Ganguly et al. ............. 370/356 |
| 2007/0211625 | A1* | 9/2007 | Liu et al. ..................... 370/229 |
| 2008/0037420 | A1* | 2/2008 | Tang .......................... 370/229 |
| 2008/0117937 | A1* | 5/2008 | Firestone et al. ............ 370/503 |
| 2009/0003209 | A1 | 1/2009 | Kalkunte et al. |
| 2009/0109895 | A1* | 4/2009 | Kota et al. ..................... 370/316 |
| 2010/0020806 | A1 | 1/2010 | Vahdat et al. |
| 2010/0061240 | A1 | 3/2010 | Sindhu et al. |
| 2010/0306408 | A1 | 12/2010 | Greenberg et al. |
| 2012/0117228 | A1 | 5/2012 | Gabriel et al. |
| 2014/0286343 | A1* | 9/2014 | Sung et al. .................... 370/400 |

OTHER PUBLICATIONS

Yoo et al. Intra and inter datacenter networking: the role of optical packet switching and flexible bandwidth optical networking. Optical Network Design and Modeling (ONDM), 2012 16th International Conference, Apr. 17-20, 2012, pp. 1-6.

Greenberg et al. Towards a next generation data center architecture: scalability and commoditization. PRESTO 2008 Proceedings of the ACM workshop on Programmable routers for extensible services of tomorrow, pp. 57-62.

(Continued)

*Primary Examiner* — Jianye Wu
(74) *Attorney, Agent, or Firm* — Ryan, Mason & Lewis, LLP (57) ABSTRACT

Techniques, systems, and articles of manufacture for reducing latencies through packet aggregation. A method includes computing an end-to-end latency for each of multiple data packets to reach a pre-determined destination, determining an aggregation scheme with a corresponding aggregation time for each of the multiple data packets, wherein the aggregation time encompasses the time needed to transmit each of the multiple data packets to an aggregation component and the time spent waiting to output the aggregation component to an output port, and wherein the aggregation time is less than the computed end-to-end latency for each of the multiple data packets, aggregating each of the multiple data packets in accordance with the aggregation scheme, and programming the aggregation component with the aggregation scheme.

20 Claims, 3 Drawing Sheets

(56) References Cited

OTHER PUBLICATIONS

Lee et al. Fine-Grained Latency and Loss Measurements in the Presence of Reordering, SIGMetrics '11, Jun. 7-11, 2011, San Jose, California, USA.

Benson et al. Network Traffic Characteristics of Data Centers in the Wild, IMC'10, Nov. 1-3, 2010, Melbourne, Australia.

Kandula et al. The nature of Data Center Traffic: Measurements and Analysis, IMC'09, Nov. 4-6, 2009, Chicago, Illinois, USA.

* cited by examiner

FIG. 2

REDUCING LATENCIES THROUGH PACKET AGGREGATION

FIELD OF THE INVENTION

Embodiments of the invention generally relate to information technology, and, more particularly, to application latency management.

BACKGROUND

The time for execution of an application flow is governed by parameters including packaging cost (at the end host machines), transmission time, and time spent on switches (per packet overhead). The time spent on switches commonly consumes a significant amount of time, and can include actions such as look-up, moving buffers from an input port to an output port, delays between receiving a data packet and transmitting a data packet, etc. Additionally, throughput of a switch is directly proportional to the amount of data transferred per packet and the number of packets processed. Accordingly, a need exists to reduce per flow end-to-end latency via management of switching devices.

SUMMARY

In one aspect of the present invention, techniques for reducing latencies through packet aggregation are provided. An exemplary computer-implemented method can include steps of computing an end-to-end latency for each of multiple data packets to reach a pre-determined destination, determining an aggregation scheme with a corresponding aggregation time for each of the multiple data packets, wherein the aggregation time encompasses the time needed to transmit each of the multiple data packets to an aggregation component and the time spent waiting to output the aggregation component to an output port, and wherein the aggregation time is less than the computed end-to-end latency for each of the multiple data packets, aggregating each of the multiple data packets in accordance with the aggregation scheme, and programming the aggregation component with the aggregation scheme.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for reducing end-to-end flow latencies through data packet aggregation. At least one embodiment of the invention includes leveraging the notion that an inter-transfer between switching devices is predominantly static, which implies that a corresponding flow path does not change significantly during the course of the flow. Accordingly, at least one embodiment of the invention includes maintaining output port "flow buckets," and computing the end-to-end delay in terms of data packets generated. As used herein, a flow bucket refers to a container for aggregating packets based on criteria and allowing transmission when the criteria are satisfied. As described herein, flow buckets (also referred to herein as aggregation components), which facilitate delaying flushing of packets to the output port, assist in reducing the number of packets to be processed. Flushing, as used herein, causes a packet that is waiting in a container/bucket to be sent.

Additionally, as further detailed herein, packets can be aggregated until the maximum transmission unit (MTU) of the transmission unit is achieved or the total transmission time is within the end-to-end delay. In at least one embodiment of the invention, the size of the MTU can be fixed by a standard (for example, Ethernet) or a system can determine the MTU at connect time. Also, empirical analysis on packet transmission time and delay can help determine an acceptable end-to-end delay.

At least one embodiment of the invention includes dynamically aggregating packets in network elements such as switches and/or routers by utilizing the inter arrival time of the packets and adjusting the flow buckets that buffer the packets. As further detailed herein, determining the time that the packets will be aggregated in the switches includes the use of parameters such as inter-arrival time, the length of a packet, the time taken to process the packets, and the end-to-end delay that is required to be maintained.

Additionally, at least one embodiment of the invention includes using emerging network framework to dynamically adjust the buffers of the switch for dynamic packet aggregation considering different quality of service (QoS) requirements and/or end applications behaviors. As used herein, an emerging network framework can refer to software-defined networking (SDN). End applications are transparent of the inner buffering mechanisms. As such, in at least one embodiment of the invention, every switch along the different paths of the applications applies the optimization such that path overlap can be leveraged.

Figure 1:
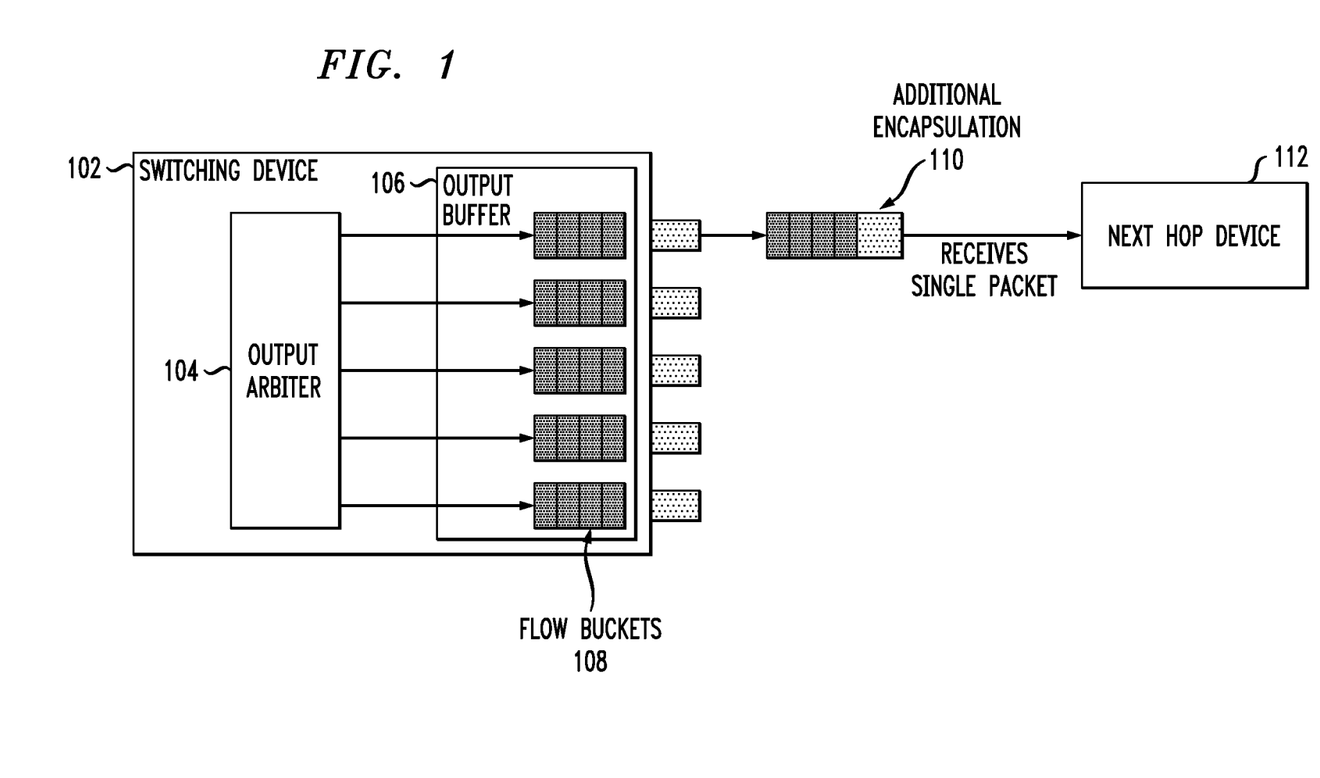
FIG. 1 is a diagram illustrating components of an exemplary embodiment of the present invention.

FIG. 1 is a diagram illustrating components of an exemplary embodiment of the present invention. By way of illustration, FIG. 1 depicts a switching device 102, which includes an output arbiter component 104 and an output buffer component 106 which includes flow buckets 108. FIG. 1 also depicts a component for additional encapsulation 110, which provides a single packet to a next hop device 112. Switching device 102 is a networking device that processes and/or routes data at the data link layer or network layer. Output arbiter component 104 allocates packets to the output ports.

Flow buckets 108 include the containers wherein the packets are buffered (in output buffer component 106) before transmission. Additional encapsulation 110 represents additional packet data that are transmitted according to at least one embodiment of the invention.

Additionally, at least one embodiment of the invention includes a form of aggregation that includes packets belonging to different flows whose next path is common to a distance. Also, at least one embodiment of the invention includes a form of aggregation that includes packets belonging to the same flow whose path remains the same. Also, aggregation techniques such as those described in accordance with one or more embodiments of the invention can be carried out at end hosts (suitable for node to node optimization through pre-defined negotiation), and/or carried out at switches (suitable for data centers where the number of hosts to be configured is significant).

In at least one embodiment of the invention, an algorithm for filling a flow bucket is carried out dynamically for each flow, aggregates a set of flows, and also determines how much time to wait for packets and how full the bucket should be before transmission. Multiple mechanisms for packet aggregation can be employed which optimize delay time and/or bucket size. For example, such a mechanism can address QoS requirements to provide differentiated service such as jitter or latency requirements for video applications. Additionally, a mechanism can exploit other network characteristics such as link utilization and packet arrival patterns.

Additionally, at least one embodiment of the invention includes the use of configurable criteria such as full-bucket and/or half-bucket, depending on the traffic and end-to-end latency computation. As used herein, "full-bucket" and "half-bucket" criteria refer to aggregation strategies that consider the amount of data that can be contained in the buckets before transmission.

Figure 2:
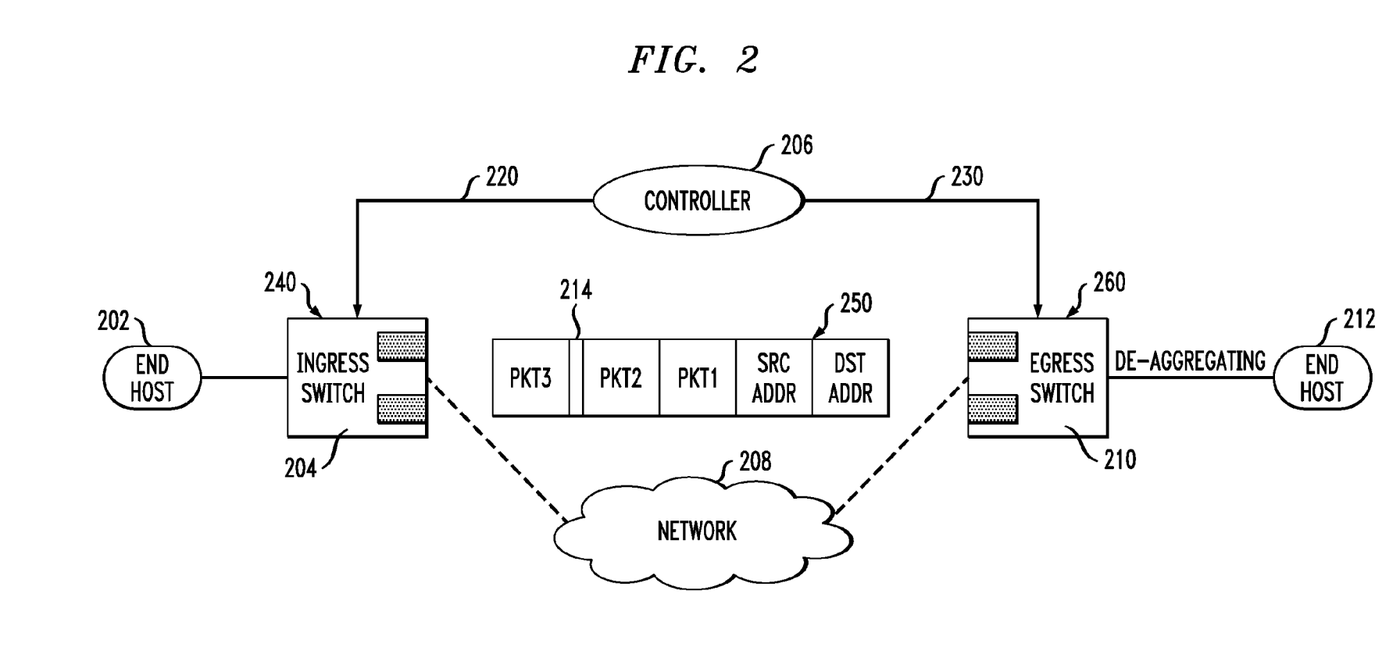
FIG. 2 is a diagram illustrating components of an exemplary embodiment of the present invention.

FIG. 2 is a diagram illustrating components of an exemplary embodiment of the present invention. By way of illustration, a controller 206 computes the routes for the flow and sets-up the flow rules. Additionally, the controller 206 can include a 'BUCKET' field that is used to inform the switches about the aggregation features. As also depicted in FIG. 2, step 220 includes informing an ingress switch 204 (associated with end host 202) of (i) a time value (and buffer sizes for each output port) and (ii) an aggregation method wherein multiple packets are joined into a single encapsulated packet. Additionally, step 230 includes informing an output egress switch 210 (associated with end host 212) about a de-aggregating method of removing the outer most encapsulated header and decoupling the packets before any routing. In at least one embodiment of the invention, step 220 and step 230 require additional hardware and/or software support (and can be performed using software OpenFlow switches).

In step 240, each buffer waits for a defined time value before the buffer is packaged into a single packet and is flushed to the output port. In step 250, an encapsulated aggregated packet 214 transmits over the network 208, and step 260 includes de-aggregating the packets and sending the packets to the output ports.

Figure 3:
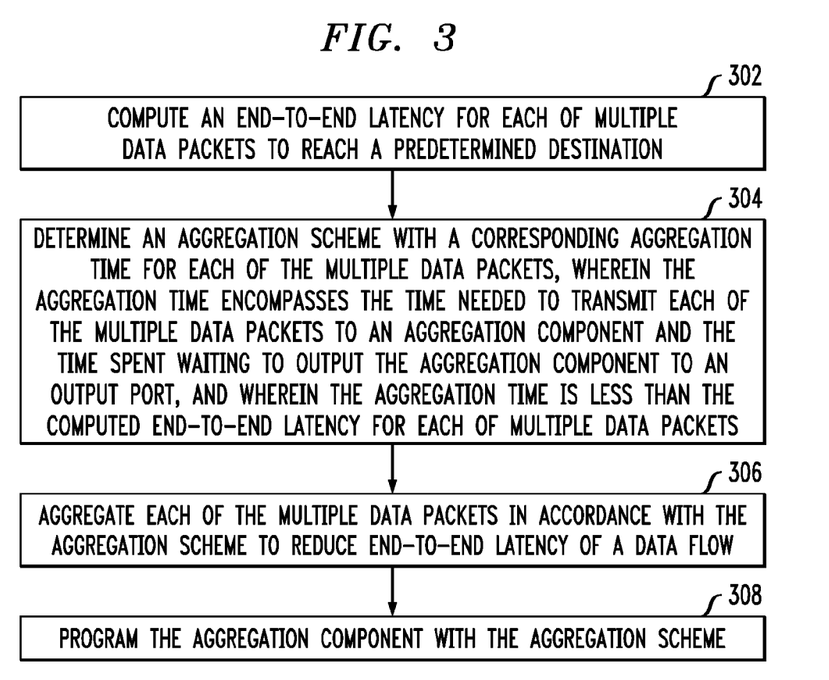
FIG. 3 is a flow diagram illustrating techniques according to an embodiment of the invention.

FIG. 3 is a flow diagram illustrating techniques according to an embodiment of the invention. Step 302 includes computing an end-to-end latency for each of multiple data packets to reach a pre-determined destination. Computing the end-to-end latency for each of multiple data packets can include computing the end-to-end latency for each of multiple data packets based on a packet arrival rate for the pre-determined destination, network topology, and/or available utilization links.

Step 304 includes determining an aggregation scheme with a corresponding aggregation time for each of the multiple data packets, wherein the aggregation time encompasses the time needed to transmit each of the multiple data packets to an aggregation component and the time spent waiting to output the aggregation component to an output port, and wherein the aggregation time is less than the computed end-to-end latency for each of the multiple data packets. In at least one embodiment of the invention, the aggregation component can include a network switch and/or a network router.

As described herein, determining an aggregation scheme includes determining the aggregation time for each of the multiple data packets. Determining the aggregation time for each of the multiple data packets can be based on inter-arrival time of each of the multiple data packets, the length of each of the multiple data packets, the time needed to process each of the multiple data packets, and/or an end-to-end latency required to be maintained for each of the multiple data packets.

Step 306 includes aggregating each of the multiple data packets in accordance with the aggregation scheme to reduce end-to-end latency of a data flow. Aggregating can be carried out, for example, until a maximum transmission unit is achieved and/or until total transmission time is within the end-to-end latency of a given data flow. Further, at least one embodiment of the invention can include aggregating two or more packets belonging to different data flows, wherein the next path destination of the two or more packets is identical, and/or aggregating two or more packets belonging to the same data flow. Additionally, step 308 includes programming the aggregation component with the aggregation scheme.

The techniques depicted in FIG. 3 can additionally include encapsulating each of the multiple data packets using a header associated with a routing purpose. Also, at least one embodiment of the invention includes carrying out one or more look-ups in the aggregation component via utilizing the header.

Additionally, at least one embodiment of the invention includes identifying each of multiple data packets in one or more data flows and a pre-determined destination associated with each of the multiple data packets. Such an embodiment also includes determining an aggregation scheme with a corresponding aggregation time for each of the multiple data packets, wherein the aggregation time encompasses the time needed to transmit each of the multiple data packets to one of multiple aggregation components and the time spent waiting to output the multiple aggregation components to the pre-determined destination. Further, such an embodiment includes aggregating each of the multiple data packets in accordance with the aggregation scheme until a pre-determined transmission unit is achieved, and programming the multiple aggregation components with the aggregation scheme.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
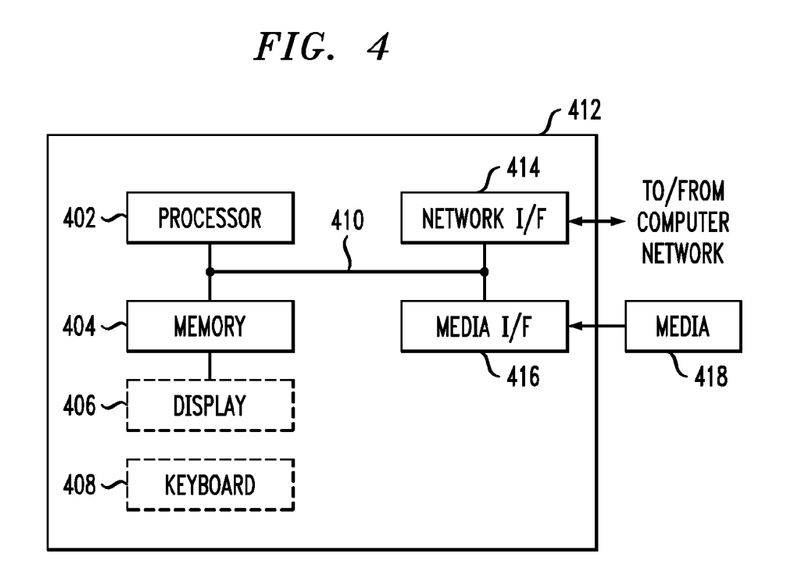
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, dynamically aggregating packets in network elements by exploiting the inter arrival time of the packets and adjusting the buckets that buffer the packets.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   estimating an end-to-end latency for each of multiple data packets to reach a pre-determined destination;

determining an aggregation scheme with a corresponding aggregation time for each of the multiple data packets, wherein the aggregation time encompasses (i) the time needed to transmit a respective one of the multiple data packets to an aggregation component and (ii) the time spent waiting to output the multiple data packets from the aggregation component to an output port determined based on one or more criteria comprising at least a configurable parameter of consumed capacity of the aggregation component, and wherein the configurable parameter is based at least in part on the estimated end-to-end latency for each of the multiple data packets such that the aggregation time is less than the estimated end-to-end latency for each of the multiple data packets;

aggregating each of the multiple data packets in accordance with the aggregation scheme; and programming the aggregation component with the aggregation scheme;

wherein said estimating, said determining, said aggregating, and said programming are carried out by a computer device.

2. The method of claim 1, wherein said estimating the end-to-end latency for each of the multiple data packets comprises estimating the end-to-end latency for each of the multiple data packets based on a packet arrival rate for the pre-determined destination.

3. The method of claim 1, wherein said estimating the end-to-end latency for each of the multiple data packets comprises estimating the end-to-end latency for each of the multiple data packets based on network topology.

4. The method of claim 1, wherein said estimating the end-to-end latency for each of the multiple data packets comprises estimating the end-to-end latency for each of the multiple data packets based on available utilization links.

5. The method of claim 1, wherein said determining an aggregation scheme comprises determining the aggregation time for each of the multiple data packets.

6. The method of claim 5, wherein said determining the aggregation time for each of the multiple data packets comprises determining the aggregation time based on inter-arrival time of each of the multiple data packets.

7. The method of claim 5, wherein said determining the aggregation time for each of the multiple data packets comprises determining the aggregation time based on the length of each of the multiple data packets.

8. The method of claim 5, wherein said determining the aggregation time for each of the multiple data packets comprises determining the aggregation time based on the time needed to process each of the multiple data packets.

9. The method of claim 5, wherein said determining the aggregation time for each of the multiple data packets comprises determining the aggregation time based on an end-to-end latency required to be maintained for each of the multiple data packets.

10. The method of claim 1, wherein the aggregation component comprises a network switch.

11. The method of claim 1, wherein the aggregation component comprises a network router.

12. The method of claim 1, wherein said aggregating each of the multiple data packets in accordance with the aggregation scheme comprises aggregating each of the multiple data packets until a maximum transmission unit is achieved.

13. The method of claim 1, wherein said aggregating each of the multiple packets in accordance with the aggregation scheme comprises aggregating two or more packets belonging to different data flows, wherein the next path destination of the two or more packets is identical.

14. The method of claim 1, wherein said aggregating each of the multiple packets in accordance with the aggregation scheme comprises aggregating two or more packets belonging to the same data flow.

15. The method of claim 1, comprising:
encapsulating each of the multiple data packets using a header associated with a routing purpose.

16. The method of claim 15, comprising:
carrying out one or more look-ups in the aggregation component via utilizing the header.

17. An article of manufacture comprising a computer readable storage medium having computer readable instructions tangibly embodied thereon which, when implemented, cause a computer to carry out a plurality of method steps comprising:

estimating an end-to-end latency for each of multiple data packets to reach a pre-determined destination;

determining an aggregation scheme with a corresponding aggregation time for each of the multiple data packets, wherein the aggregation time encompasses (i) the time needed to transmit a respective one of the multiple data packets to an aggregation component and (ii) the time spent waiting to output the multiple data packets from the aggregation component to an output port determined based on one or more criteria comprising at least a configurable parameter of consumed capacity of the aggregation component, and wherein the configurable parameter is based at least in part on the estimated end-to-end latency for each of the multiple data packets such that the aggregation time is less than the estimated end-to-end latency for each of the multiple data packets;

aggregating each of the multiple data packets in accordance with the aggregation scheme; and programming the aggregation component with the aggregation scheme.

18. The article of manufacture of claim 17, wherein the method steps comprise:
encapsulating each of the multiple data packets using a header associated with a routing purpose.

19. A system comprising:
a memory; and
at least one processor coupled to the memory and configured for:
estimating an end-to-end latency for each of multiple data packets to reach a pre-determined destination;

determining an aggregation scheme with a corresponding aggregation time for each of the multiple data packets, wherein the aggregation time encompasses (i) the time needed to transmit a respective one of the multiple data packets to an aggregation component and (ii) the time spent waiting to output the multiple data packets from the aggregation component to an output port determined based on one or more criteria comprising at least a configurable parameter of consumed capacity of the aggregation component, and wherein the configurable parameter is based at least in part on the estimated end-to-end latency for each of the multiple data packets such that the aggregation time is less than the estimated end-to-end latency for each of the multiple data packets;

aggregating each of the multiple data packets in accordance with the aggregation scheme; and programming the aggregation component with the aggregation scheme.

20. A method comprising:

identifying each of multiple data packets in one or more data flows and a pre-determined destination associated with each of the multiple data packets;

determining an aggregation scheme with a corresponding aggregation time for each of the multiple data packets, wherein the aggregation time encompasses (i) the time needed to transmit a respective one of the multiple data packets to one of multiple aggregation components and (ii) the time spent waiting to output the multiple data packets from the multiple aggregation components to the pre-determined destination determined based on one or more criteria comprising at least a configurable parameter of consumed capacity of each of the multiple aggregation components, and wherein the configurable parameter is based at least in part on an estimated end-to-end latency for each of the multiple data packets such that the aggregation time is less than the estimated end-to-end latency for each of the multiple data packets;

aggregating each of the multiple data packets in accordance with the aggregation scheme until a pre-determined transmission unit is achieved; and programming the multiple aggregation components with the aggregation scheme;

wherein said identifying, said determining, said aggregating, and said programming are carried out by a computer device.

* * * * *